United States Patent [19]

Morrison

[11] Patent Number: 5,642,609

[45] Date of Patent: Jul. 1, 1997

[54] MULTI-CUTTING EDGE MULCHING LAWN MOWER BLADE

[76] Inventor: Gerald Steven Morrison, 661 N. Coles Ave., Maple Shade, N.J. 08052

[21] Appl. No.: 607,297

[22] Filed: Feb. 26, 1996

[51] Int. Cl.$^6$ .................... A01D 34/64; A01D 34/10
[52] U.S. Cl. ............................ 56/255; 56/295
[58] Field of Search ................ 15/300.1, 347; 30/275, 276; 56/17.5, 16.9, 12.8, 255, 295

[56] References Cited

U.S. PATENT DOCUMENTS

| | | | |
|---|---|---|---|
| 2,859,581 | 11/1958 | Kroll et al. | 56/295 |
| 3,078,573 | 2/1963 | Kern | 56/295 X |
| 3,103,094 | 9/1963 | Cook | 56/295 |
| 3,338,039 | 8/1967 | Nightingale et al. | 56/295 |
| 3,392,515 | 7/1968 | Plous | 56/295 |
| 3,420,043 | 1/1969 | Hershey | 56/295 |
| 3,474,608 | 10/1969 | Frick | 56/295 |
| 3,681,903 | 8/1972 | Phillips | 56/295 |
| 4,369,618 | 1/1983 | Dell | 56/295 |

*Primary Examiner*—Terry Lee Melius
*Assistant Examiner*—Robert Pezzuto

[57] ABSTRACT

A multi-cutting edge mulching lawn mower blade including a central disk member having a central aperture formed therethrough. The central aperture is dimensioned for rotatable coupling with a spindle shaft of a lawn mower. A plurality of first blade members each have interior edges extending outwardly from a peripheral edge of the central disk member. Each of the first blade members have a cutting edge formed on an interior edge thereof. A plurality of second blade members each have interior edges extending outwardly from the peripheral edge of the central disk member. Each of the second blade members are positioned between the first blade members. Each of the second blade members have a cutting edge formed on an interior edge thereof wherein each cutting edge of the second blade members are disposed above each cutting edge of first blade members.

1 Claim, 3 Drawing Sheets

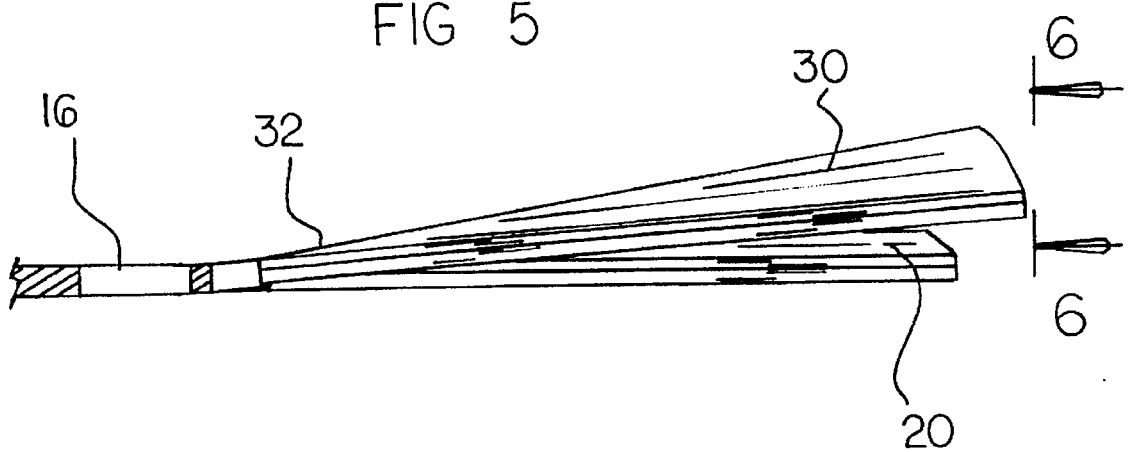
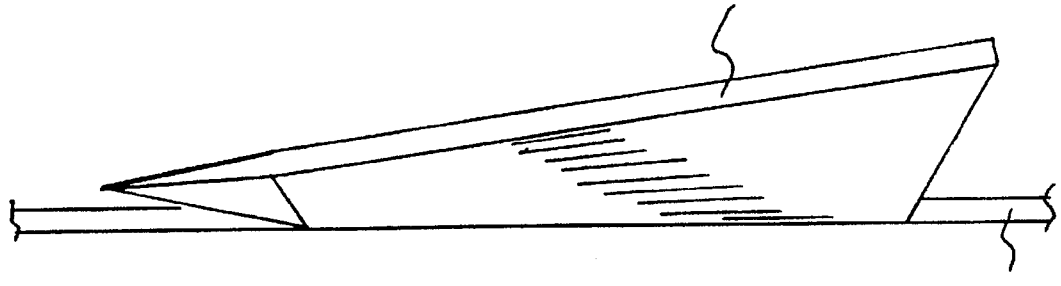

MULTI-CUTTING EDGE MULCHING LAWN MOWER BLADE

BACKGROUND OF THE INVENTION

1. Field of the Invention

The present invention relates to a multi-cutting edge mulching lawn mower blade and more particularly pertains to creating a high vacuum mulching arrangement for a lawn mower with a multi-cutting edge mulching lawn mower blade.

2. Description of the Prior Art

The use of mulching blades is known in the prior art. More specifically, mulching blades heretofore devised and utilized for the purpose of shredding grass and leaves are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,293,735 to Nascone discloses a mulching blade for rotary lawn mower.

U.S. Pat. No. 5,197,268 to Barrera discloses a mulching blade.

U.S. Pat. No. 347,773 to Nash discloses the ornamental design for a leaf mulching attachment for rotating line trimmer.

U.S. Pat. No. 5,321,940 to Peterson discloses a multi-edge mower blade.

U.S. Pat. No. 5,209,052 to Carroll discloses a cutting and mulching blade assembly.

U.S. Pat. No. 5,363,635 to White, III et al. discloses a mulching mower with improved mulching blade.

While these devices fulfill their respective, particular objective and requirements, the aforementioned patents do not describe a multi-cutting edge mulching lawn mower blade for creating a high vacuum mulching arrangement for a lawn mower.

In this respect, the multi-cutting edge mulching lawn mower blade according to the present invention substantially departs from the conventional concepts and designs of the prior art, and in doing so provides an apparatus primarily developed for the purpose of creating a high vacuum mulching arrangement for a lawn mower.

Therefore, it can be appreciated that there exists a continuing need for new and improved multi-cutting edge mulching lawn mower blade which can be used for creating a high vacuum mulching arrangement for a lawn mower. In this regard, the present invention substantially fulfills this need.

SUMMARY OF THE INVENTION

In the view of the foregoing disadvantages inherent in the known types of mulching blades now present in the prior art, the present invention provides an improved multi-cutting edge mulching lawn mower blade. As such, the general purpose of the present invention, which will be described subsequently in greater detail, is to provide a new and improved multi-cutting edge mulching lawn mower blade and method which has all the advantages of the prior art and none of the disadvantages.

To attain this, the present invention essentially comprises a central disk member having a central aperture formed therethrough. The central aperture is dimensioned for rotatable coupling with a spindle shaft of a lawn mower. The central disk member has a plurality of outer apertures arranged in a circular configuration inwardly of a peripheral edge of the disk member. The device includes a plurality of first blade members each having interior edges extending outwardly from the peripheral edge of the central disk member. Each of the first blade members have a cutting edge formed on an interior edge thereof. Each of the first blade members have an aperture formed through a central portion thereof. The device includes a plurality of second blade members each having interior edges extending outwardly from the peripheral edge of the central disk member. Each of the second blade members is positioned between first blade members. Each of the second blade members have a cutting edge formed on an interior edge thereof wherein each cutting edge of the second blade members are disposed above each cutting edge of first blade members. Each of the second blade members have an aperture formed through a central portion thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multi-cutting edge mulching lawn mower blade which has all the advantages of the prior art mulching blades and none of the disadvantages.

It is another object of the present invention to provide a new and improved multi-cutting edge mulching lawn mower blade which may be easily and efficiently manufactured and marketed.

It is a further object of the present invention to provide a new and improved multi-cutting edge mulching lawn mower blade which is of durable and reliable construction.

An even further object of the present invention is to provide a new and improved multi-cutting edge mulching lawn mower blade which is susceptible of a low cost of manufacture with regard to both materials and labor, and which accordingly is then susceptible of low prices of sale to the consuming public, thereby making such a multi-cutting edge mulching lawn mower blade economically available to the buying public.

Still yet another object of the present invention is to provide a new and improved multi-cutting edge mulching lawn mower blade which provides in the apparatuses and methods of the prior art some of the advantages thereof, while simultaneously overcoming some of the disadvantages normally associated therewith.

Even still another object of the present invention is to provide a new and improved multi-cutting edge mulching lawn mower blade for creating a high vacuum mulching arrangement for a lawn mower.

Lastly, it is an object of the present invention to provide a new and improved multi-cutting edge mulching lawn mower blade including a central disk member having a central aperture formed therethrough. The central aperture is dimensioned for rotatable coupling with a spindle shaft of a lawn mower. A plurality of first blade members each have interior edges extending outwardly from a peripheral edge of the central disk member. Each of the first blade members have a cutting edge formed on an interior edge thereof. A plurality of second blade members each have interior edges extending outwardly from the peripheral edge of the central disk member. Each of the second blade members are positioned between the first blade members. Each of the second blade members have a cutting edge formed on an interior edge thereof wherein each cutting edge of the second blade members are disposed above each cutting edge of first blade members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view as taken along line 5—5 of FIG. 2.

FIG. 6 is a cross-sectional view as taken along line 6—6 of FIG. 5.

The same reference numerals refer to the same parts through the various Figures.

DESCRIPTION OF THE PREFERRED EMBODIMENT

Figure 1:
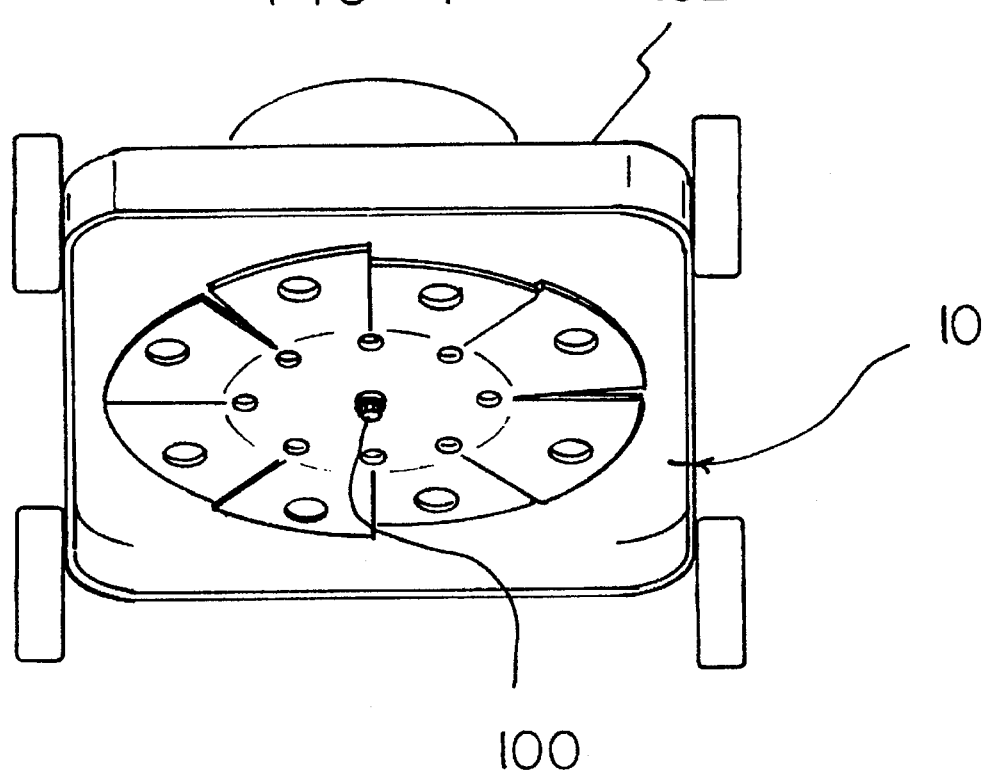
FIG. 1 is a perspective view of the preferred embodiment of the multi-cutting edge mulching lawn mower blade constructed in accordance with the principles of the present invention.
Figure 2:
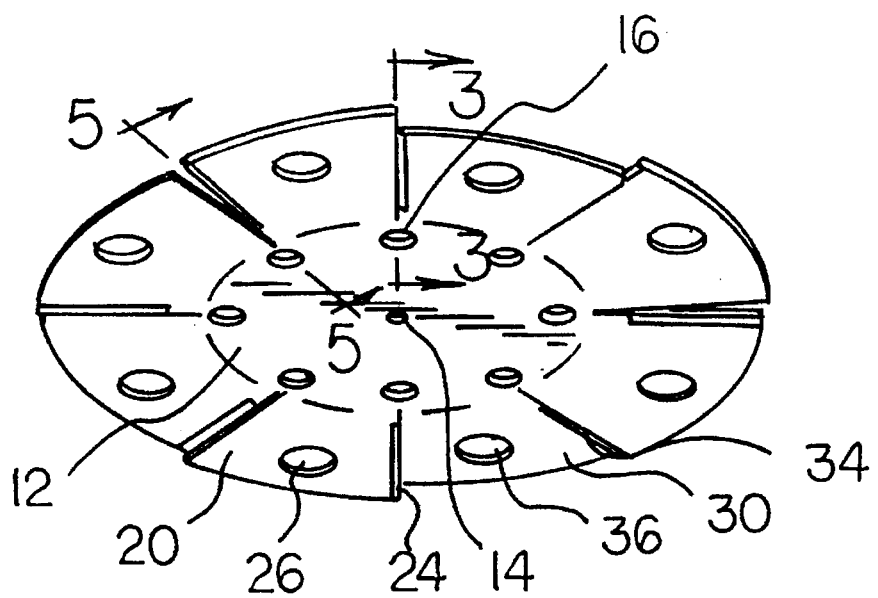
FIG. 2 is an elevated front view of the device as separated from a lawn mower.
Figure 3:
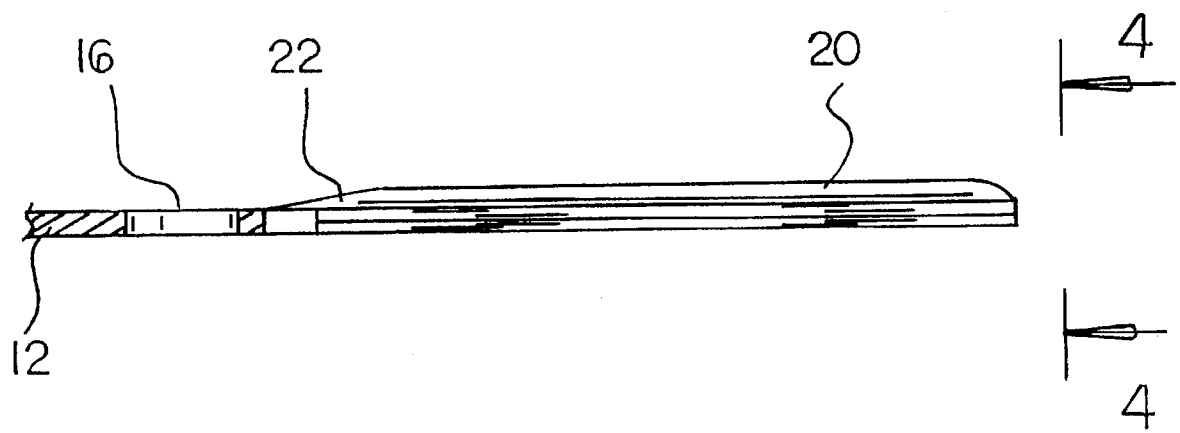
FIG. 3 is a cross-sectional view as taken along line 3—3 of FIG. 2.
Figure 4:
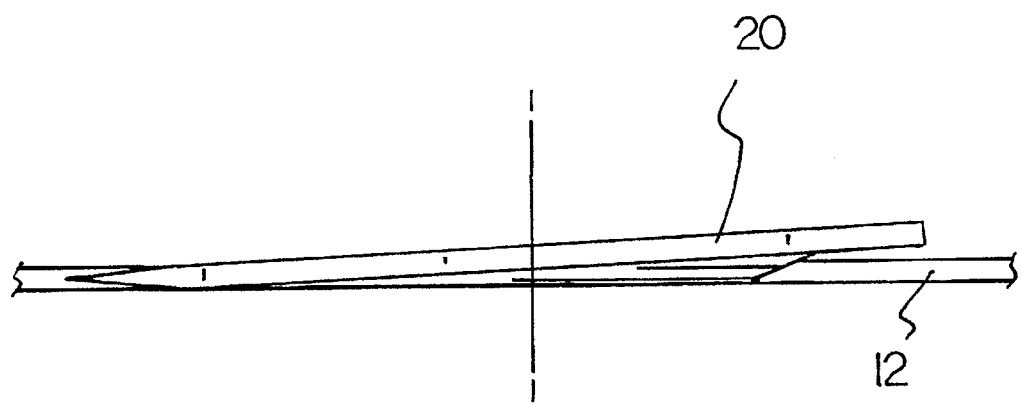
FIG. 4 is a cross-sectional view as taken along line 4—4 of FIG. 3.

With reference now to the drawings, and in particular, to FIG. 1 thereof, the preferred embodiment of the new and improved multi-cutting edge mulching lawn mower blade embodying the principles and concepts of the present invention and generally designated by the reference number 10 will be described.

Specifically, it will be noted in the various Figures that the device relates to a new and improved multi-cutting edge mulching lawn mower blade for creating a high vacuum mulching arrangement for a lawn mower. In its broadest context, the device consists of a central disk member, a plurality of first blade members, and a plurality of second blade members. Such components are individually configured and correlated with respect to each other so as to attain the desired objective.

The device 10 includes a central disk member 12 having a central aperture 14 formed therethrough. The central aperture 14 is dimensioned for rotatable coupling with a spindle shaft 100 of a lawn mower 102. The central disk member 12 will be able to be adjusted to desired heights within the lawn mower 102. The disk member 12 is secured to the spindle shaft 100 by means known in the art. The central disk member 12 has a plurality of outer apertures 16 arranged in a circular configuration inwardly of a peripheral edge of the disk member 12. The plurality of outer apertures 16 allow grass clippings to exit from the device 10. The size of the disk member 12 can be varied to accommodate different sized lawn mowers. The disk member 12 can also be used in commercial and industrial applications where more than one disk member 12 would be required.

Next, the device 10 includes a plurality of first blade members 20 each having interior edges 22 extending outwardly from the peripheral edge of the central disk member 12. Each of the first blade members 20 have a cutting edge 24 formed on an interior edge thereof. Each of the first blade members 20 have an aperture 26 formed through a central portion thereof. The aperture 26 serves to provide weight reduction and balance to the device 10.

Lastly, the device 10 includes a plurality of second blade members 30 each having interior edges 32 extending outwardly from the peripheral edge of the central disk member 12. Each of the second blade members 30 is positioned between first blade members 20. Each of the second blade members 30 have a cutting edge 34 formed on an interior edge thereof wherein each cutting edge 34 of the second blade members 30 are disposed above each cutting edge 24 of first blade members 20. Each of the second blade members 30 have an aperture 36 formed through a central portion thereof. Once the lawn mower 102 is running, the disk member 12 is activated in a rotating manner. The lawn mower 102 is then directed over grass to be cut. The first blade members 20 cut the grass with the clippings rising upwardly to be cut again by the second blade members 30. The first blade members 20 and the second blade members 30 each are angled slightly downwardly to facilitate the downward movement of the grass clippings into the mowed area.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A multi-cutting edge mulching lawn mower blade for creating a high vacuum mulching arrangement for a lawn mower comprising, in combination:

a central disk member having a central aperture formed therethrough, the central aperture being dimensioned for rotatable coupling with a spindle shaft of the lawn mower, the central disk member having a plurality of outer apertures arranged in a circular configuration inwardly of a peripheral edge of the disk member;

a plurality of first blade members each having interior edges extending outwardly from the peripheral edge of the central disk member, each of the first blade members having a cutting edge formed on the interior edges thereof, each of the first blade members having a through hole formed through a central portion thereof;

a plurality of second blade members each having inner edges extending outwardly from the peripheral edge of the central disk member, each of the second blade members positioned between first blade members in an alternating arrangement, each of the second blade members having a cutting edge formed on the inner edges thereof wherein each cutting edge of the second blade members being disposed above each cutting edge of the first blade members, each of the second blade members having a circular opening formed through a central portion thereof.

* * * * *